United States Patent
Dickson

(10) Patent No.: US 7,941,172 B2
(45) Date of Patent: May 10, 2011

(54) HISTORY BASED MEASURED POWER CONTROL RESPONSE

(75) Inventor: Scott Dickson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1249 days.

(21) Appl. No.: 10/625,587

(22) Filed: Jul. 22, 2003

(65) Prior Publication Data

US 2004/0147275 A1 Jul. 29, 2004

Related U.S. Application Data

(60) Provisional application No. 60/398,264, filed on Jul. 23, 2002.

(51) Int. Cl.
*H04W 52/22* (2009.01)
*H04B 7/185* (2006.01)

(52) U.S. Cl. ....... 455/522; 455/69; 455/13.4; 455/67.11

(58) Field of Classification Search .................. 455/522, 455/68, 69, 423, 424, 67.11, 13.4, 12.1; 370/335, 370/342, 311
See application file for complete search history.

(56) References Cited

U.S. PATENT DOCUMENTS

| 6,147,981 | A | 11/2000 | Prescott | |
|---|---|---|---|---|
| 6,556,838 | B1* | 4/2003 | Baker et al. | 455/522 |
| 2002/0193115 | A1* | 12/2002 | Furukawa et al. | 455/442 |

FOREIGN PATENT DOCUMENTS

| EP | 0881784 | 12/1998 |
|---|---|---|
| EP | 1104118 | 5/2001 |
| WO | 9908397 | 2/1999 |
| WO | 0074261 | 12/2000 |
| WO | 0225848 | 3/2002 |

OTHER PUBLICATIONS

Kauffmann, P., "Fast power control for third generation DS-CDMA mobile radio systems," Broadband Communications, 2000. Piscataway, NJ, Feb. 15, 2000, pp. 9-13.
International Search Report—PCT/US03/023070—International Search Authroity EPO, Dec. 2, 2003.
International Preliminary Report on Patentability—PCT/US03/023070—International Search Authority IPEA—US, Aug. 4, 2004.

* cited by examiner

*Primary Examiner* — Philip J Sobutka
(74) *Attorney, Agent, or Firm* — Donald C. Kordich

(57) ABSTRACT

Frames received on a first link of a channel are grouped or queued for later processing in a batch or batch mode. Power control instructions included with the frames are examined, and a history of predetermined length is kept. Frames to be transmitted on a second link of the channel are also batched for later handling in batch. Power control bits are generated for the frames, based at least in part on the history kept, in a manner that effectuates a slowing of responding to the incoming power control instructions.

29 Claims, 8 Drawing Sheets

HISTORY BASED MEASURED POWER CONTROL RESPONSE

RELATED APPLICATIONS

This application claims the benefit of prior filed provisional application 60/398,264, filed on Jul. 23, 2002.

FIELD OF THE INVENTION

The present invention relates to the field of wireless communications. More particularly the present invention relates to method and apparatus for responding to power control instructions received on a reverse link of a channel, in the context of queuing and batch processing received transmission frames.

BACKGROUND OF THE INVENTION

Advances in satellite communication and related technology have led to rapid deployment of mobile satellite services (MSS) in recent years. While economic factors have slowed the growth of these systems, tens of thousands of user terminals are currently in use, providing valuable services in areas that otherwise would not have communications services.

Delivery of mobile satellite services, in addition to the user terminals, typically includes the provision of space vehicles, i.e. satellites, and a number of gateways, also referred to as base stations. The satellites serve as "relays" between the gateways and the user terminals.

Power controls are often employed to manage the exchange of signals between a user terminal and a gateway via one or more satellites. In particular, power control instructions, in the form of e.g. power control bits, are often included in or with the transmission frames received on a reverse link of a channel (also referred to as a return link of the channel).

In the context of MSS, a channel corresponds to an assigned frequency. In the context of multi-access, such as in the case of Time Division Multiple Access (TDMA), a channel is divided into multiple time slots, with one or more time slots assigned to each user terminal. The aggregate of these time slots, plus some overhead data bits, corresponds to a transmission frame. Analogously, in the case of Code Division Multiple Access, a channel is shared among simultaneous users by encoding the transmissions for each user with an orthogonal or nearly orthogonal spreading code.

Increasing the number of users, and the usage by the users, results in increased data traffic, which in turn translates into an increased amount of transmissions from the user terminals and processing to be performed by the gateways. To facilitate handling of the increased amount of processing, some gateways may desire to queue the transmission frames received on the reverse link of a channel and process them in batches.

Power control is important in CDMA systems for optimal capacity, so each transmission frame for user traffic (e.g., voice or data) typically carries a power control instruction (typically a single bit, indicating power up or down one increment) for the transmitter at the other end of the communication link. If the power control instructions are responded to in the same manner in the queued/batched processing context as they are responded to in the real time non-queued/un-batched processing context, acting upon excessive consecutive identical power control commands might result due to the delay inserted in the power control loop by the queuing. In turn, the excessive consecutive issuance of identical power control commands may lead to the loss of the channel or communication link.

Thus, an improved approach to responding to power control instructions, when transmission frames are queued or processed in batches, is desired.

SUMMARY OF THE INVENTION

Briefly, the present invention provides a method and apparatus to slow the response or response rate to power control instructions that are determined or generated by a receiver on a communications link for an opposite or corresponding transmitter, and included with each frame received on a link of a channel. If the receiver determines that the opposite or correspondingly received transmission is too weak, it will include a power-up command recommendation with the received frame and vice versa.

Under operating conditions, a first plurality of frames received over a link are queued for later processing in batches. To slow the response to power control instructions included with the received frames, the instructions or commands are examined, and a running history of predetermined length is kept. A second plurality of frames to be transmitted on the opposite direction link of the channel are also queued for later handling in batches. Power control instructions are generated for inclusion with the queued frames to be transmitted, based at least in part on the history being kept or maintained, to effectuate the desired slowing of response to the incoming power control instructions.

In accordance with one aspect of the present invention, the power control instructions and responses are in a form of power control bits, and the predetermined length of the history is on the order of 2 bits, for a typical communication system or link. The number m of "zero" value power control bits and the number n of "one" value power control bits generated for inclusion with the frames to be transmitted, are dependent on the bit pattern of the 2-bit history, and whether or not the second plurality of frames contains an even or odd number of frames, and the two values may be equal or differ by say 1.

The method or apparatus keeping and generating operations may be performed in a gateway of a wireless communication system, or in an emulated gateway and a gateway simulator of a wireless communication test system.

In further aspects, the wireless communication system gateway uses a transceiver to receive a first plurality of frames on a link of a channel, and queues the first frames for processing in batch form, each of the frames including a power control instruction, and outputs the power control instruction included with each of the first plurality of frames. A processing subsystem coupled to the transceiver processes or examines the information in the queued first frames to receive the power control instructions, and to generate a second plurality of frames for a return direction link over the channel, such frames also being queued before being handled by or processed in the transceiver. The processing subsystem: keeps a running history of the examined power control instructions included with the first frames, up to a predetermined length of time, and generates power control commands for the second frames based at least in part on this retained or maintain running history being, in a manner that effectuates slowing of a response or response rate to the power control instructions.

In further aspects of the gateway, the processing subsystem is designed to generate m "zero" value power control bits and n "one" value power control bits for each batch formed with the second plurality of frames, the number being dependent upon whether or not there are an even or odd number of frames, and information bit values of the control commands.

In further embodiments, wireless communication apparatus is provided having a gateway emulator configured to emulate receipt of a first plurality or set of frames in one direction on a link of a channel, and grouping or queuing these first frames for processing in batch form, the frames including or accompanied by power control instructions. The gateway emulator provides power control instructions with each of the first set of frames. A gateway simulator coupled to the gateway emulator processes the queued first frames in batch form and receives or detects the value of power control instructions processed by the gateway emulator, and generates a second plurality of frames for a return direction link of the channel, which are also queued before being handled by the gateway emulator in batch form. The gateway simulator keeps a running history, up to a predetermined length, of the power control instructions included with the first set of frames, and generates corresponding power control commands for the second set of frames based at least in part on the maintained running history, in a manner that effectuates a slowing of responses to the power control instructions. The gateway simulator is designed to generate m "zero" value power control bits and n "one" value power control bits, as desired, for each batch formed with a subset of the second frames.

In further embodiments, apparatus for realizing the advantages and features of the invention is provided having means for keeping a running history, up to a predetermined length, of power control instructions included with a first plurality of frames received in one direction on a link of a communications channel, which frames grouped before their processing, and means for generating power control commands for a second plurality of frames to be transmitted in an opposing direction over the link on the channel, based at least in part on the maintained running history, in a manner that effectuates a slowing response to the incoming power control instructions, with the second frames also being grouped for subsequent processing in batch form for transmission.

The operations of the invention may be realized using a machine readable medium having stored thereon machine executable instructions that when executed implement a method comprising maintaining a running history, up to a predetermined time or length, of power control instructions included with a first plurality of frames received on a link of a channel, the first frames being grouped before their processing; and generating power control commands for a second plurality of frames to be transmitted on the link for the channel in a reverse direction, based at least in part on the running history being detected and maintained, in a manner that effectuates a slowing of response or response rate to received power control instructions, with the second frames also being grouped for subsequent processing in batch form for transmission.

BRIEF DESCRIPTION OF THE DRAWINGS

Examples of the present invention are illustrated by way of example in the accompanying drawings. The drawings do not, however, limit the scope of the present invention. Similar references in the drawings indicate similar elements.

DETAILED DESCRIPTION OF EMBODIMENTS

Various embodiments of the methods and apparatus to slow responding to power control instructions to reduce the likelihood of issuing an excessive number of consecutive power control instructions that might lead to the loss of a channel or communication link in wireless communication for a wireless communication system or device, will now be described.

In the description to follow, various aspects of these embodiments will be described. However, it will be apparent to those skilled in the art that the present invention may be practiced with only some, or with all aspects of these embodiments described. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

A Generic Embodiment

Figure 1:
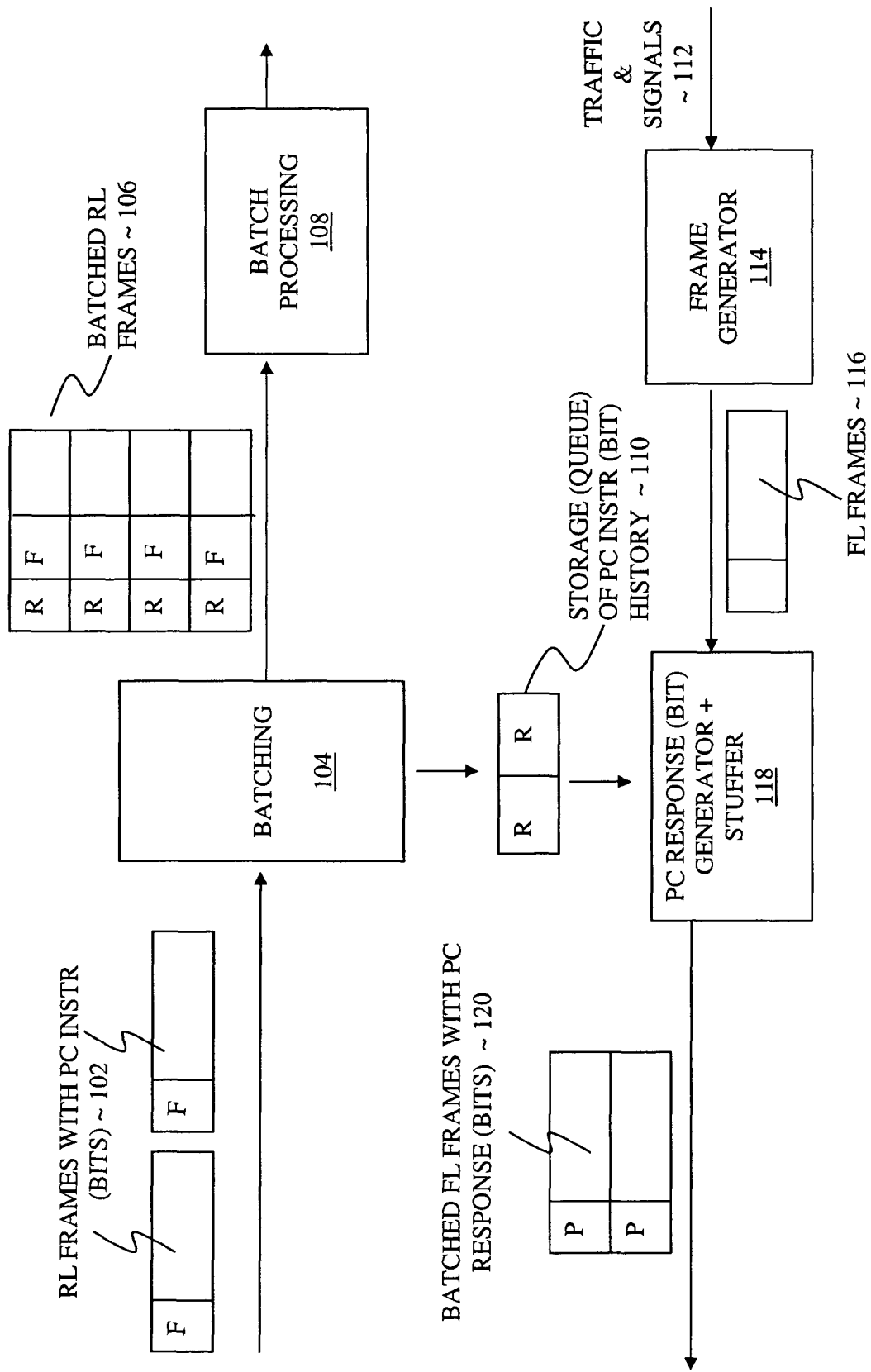
FIG. 1 illustrates a method of the present invention, in accordance with one embodiment.

Referring now to FIG. 1, wherein a block diagram illustrating a generic embodiment of the invention is shown. This generic embodiment includes, in particular, batching logic 104 and power control command generator/stuffer 118, both incorporated within the teachings of the invention. The embodiment also includes a storage location, element, or device 110. Additionally, the embodiment also includes batch processing logic 108, and frame generator 114. The elements are operationally coupled to each other as shown.

Batching logic 104 is employed to queue or group together or batch received transmission frames 102 on a link of a channel, e.g. the reverse or return link (RL) where signals are transferred from a transmitter in a user terminal to a receiver in a gateway, into frame batches 106, for subsequent processing in batch, e.g., by batch processing logic 108. Additionally, it is employed to output the power control instructions R included with the received transmission frames 102, thus enabling a running history of the included power control instructions, up to a predetermined length or period of time, to be kept or maintained.

For an embodiment, storage 110 is employed to store, contain, or hold the running history, up to a predetermined length. As will be described in more detail below, the running history is employed in the generation of the power control responses or commands used to slow down the response actions or responding to the power control instructions, thereby reducing the likelihood of issuing excessive consecutive power control commands, which might lead to the loss of the channel.

Batch processing logic 108, as its name suggests, is employed to process the frame batches 106. The exact nature of the processing performed is not relevant to practice of the present invention, and is understood by those skilled in the art for the system of interest.

Frame generator 114 is employed to organize the transmit traffic/signals to be transmitted on a link of a channel, e.g. the forward link (FL) where signals are transferred from a transmitter in a gateway to a receiver in a user terminal, into frames 116. The manner in which transmit traffic/signals is framed also is not relevant to the practice of the present invention and is understood by those skilled in the art for the specific communication system being employed.

Power control command generator/stuffer 118 is employed to generate and insert power control commands P into frames 116 to be transmitted on the forward link of the channel. For this embodiment, it also queues frames 116 into frame batches 120 for subsequent handling by a typical transceiver subsystem (not shown) in batches or groups.

Thus, operationally, as transmission frames 102 are received on the reverse or return link of a channel, transmission frames 102 are queued or batched together by batching logic 104 into RL frame batches 106 for subsequent processing in batch, e.g., by batch processing logic 108. Concurrently, a running history of the included power control instructions, up to a predetermined length, or time period, is kept in storage 110, for subsequent use in slowing response to the power control instructions.

As transmit traffic and signals 112 are being organized into transmission frames 116 by frame generator 114, for transmission on the forward link of the channel, the generated frames 116 are also provided to power control response generator/stuffer 118 to have power control responses generated and inserted to transfer with the transmission frames 116.

In accordance with embodiments, generator/stuffer 118 generates the power control responses based at least in part on the running history being maintained in storage 110. More specifically, as described earlier, it generates the power control commands based at least in part on the running history kept, in a manner that slows the response to the power control instructions, thereby reducing the likelihood of over issuing consecutive power control commands, which may lead to the loss of a channel. For example, issuing excessive power decrease commands, which cause the channel to drop below a useful power level to either maintain a link or connection, or to increase errors in reception. Likewise, excessive issuance of power increase commands could cause a user terminal to use too much power and cause interference with other user terminals or signals, as well as unnecessarily consume valuable power supply resources.

For the embodiment, at least selected ones of transmission frames 102 include power control instructions in the form of power control bits. These power control bits are output by batching logic 104 as it queues or batches the received frames 102 into frame batches 106. The power control bits are examined and their values or control information being provided is successively stored in storage 110, in the form of a queue. An exemplary queue has a queue length on the order of 2 bits. However, other queue lengths may be employed as desired, depending among other things on the amount of command information to be stored.

Generator/stuffer 118 generates the power control commands based at least in part on the running history in the queue, here 2-bit, being kept. More specifically, for one embodiment, it generates the power control commands based at least in part on the running 2-bit history kept, in a manner that slows the response to the power control instructions to approximately the rate of batch processing, to be described in more detail with reference to FIG. 2.

Besides accruing a copy or version of the power control instructions for history keeping purposes, batching logic 104, batch processing 108 and frame generator 114, all represent a wide range of these elements known in the art. Accordingly, they will not be further described. Implementing outputting of the power control instructions while batching the received frames is well within the ability of those skilled in the art, thus it too need not be further described in detail here.

Power Control Command Generation

Figure 2:
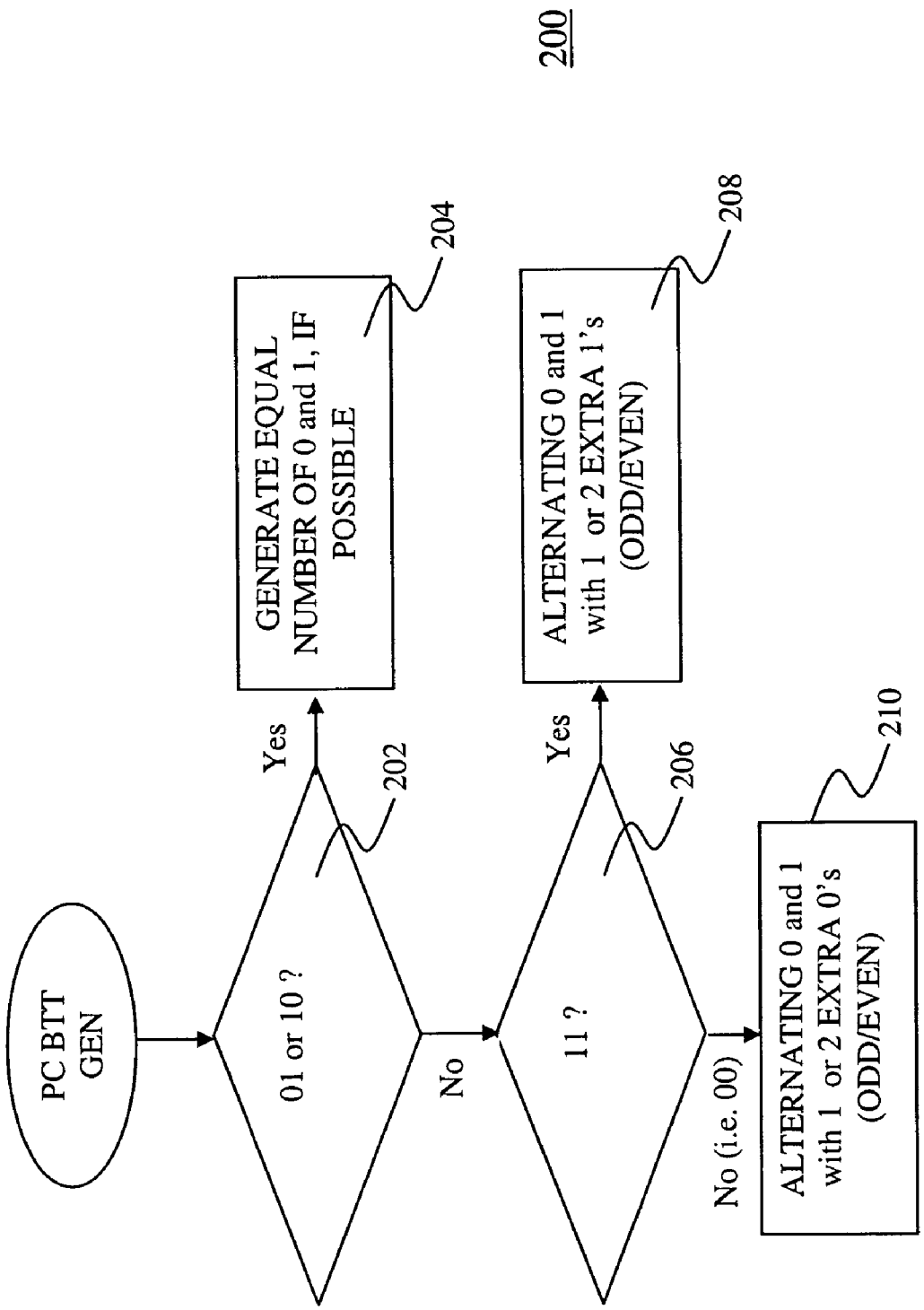
FIG. 2 illustrates the history based power control generation of FIG. 1 in further detail, in accordance with one embodiment.

FIG. 2 illustrates the operational flow of the relevant aspects of power control command generator/stuffer 118 of FIG. 1, in accordance with one embodiment. The embodiment assumes the power control instructions R and commands P are in the form of power control bits, and a running 2-bit history of the power control bits included with the received frames are kept.

As illustrated, in the relevant part, generator/stuffer 118 determines whether or not the 2-bit history has either the bit pattern of "01" or "10", in a step or processing stage 202. If it is determined that the 2-bit history has either of the two bit patterns, generator/stuffer 118 generates approximately equal numbers of "zero" value and "one" value power control command bits, i.e. m "zero" value power control response bits, and n "one" value power control response bits, with m and n being different at most by 1, m and n are both integers, stage 204.

If there are an even number of frames, the number of "zero" value and "one" value power control command bits generated, i.e. m and n, are equal. If there are an odd number of frames, the batches will alternate having the number of "zero" value power control command bits generated (m) greater than "one" value power control response bits generated (n) by "1".

In one embodiment, the batches occupying the odd ordinal positions, in terms of batch generation, will have m greater than n by 1, and the batches occupying the even ordinal positions, in terms of batch generation, will have n greater than m by 1.

In another embodiment, the arrangement is reversed, i.e. the batches occupying the odd ordinal positions, in terms of batch generation, will have n greater than m by 1, and the batches occupying the even ordinal positions, in terms of batch generation, will have m greater than n by 1.

If at step or stage 202, it is determined that the 2-bit history does not have either the "01" or "10" bit pattern, generator/stuffer 118 further determines whether or not the 2-bit history has the bit pattern of "11". If it is determined that the 2-bit history has the bit pattern of "11", generator/stuffer 118 alternates in generating "one" value power control command bits, and "zero" value power control command bits, with one or two extra "one" value power control command bits, depending on whether there are odd or even numbers of frames in a batch, step 208.

When there are an odd number of frames in a batch, the batch is formed naturally with an extra "one" value power control command bit. When there are an even number of frames in a batch, generator/stuffer 118 generates the last bit as a "one" value power control bit also, thereby making the last two power control command bits, "one" value bits. Accordingly, the number of "one" value power control command bits generated will exceed the number of "zero" value power control bits by 2.

If at step or processing stage 204, it is determined that the 2-bit history does not have the "11" bit pattern, nor the other patterns discussed above, the 2-bit history by default has the "00" bit pattern. Generator/stuffer 118 alternates in generating "zero" value power control command bits, and "one" value power control response bits, with one or two extra "zero" value power control command bits, depending on whether or not there are an odd or even number of frames in a batch, step 210.

When there are an odd number of frames in a batch, the batch is formed naturally with an extra "zero" value power control command bit. When there are an even number of frames in a batch, generator/stuffer 118 generates the last bit as a "zero" value power control bit also, thereby making the last two power control command bits, "zero" value bits. Accordingly, the number of "zero" value power control command bits generated will exceed the number of "one" value power control bits generate by 2.

A Gateway Embodiment

Figure 3:
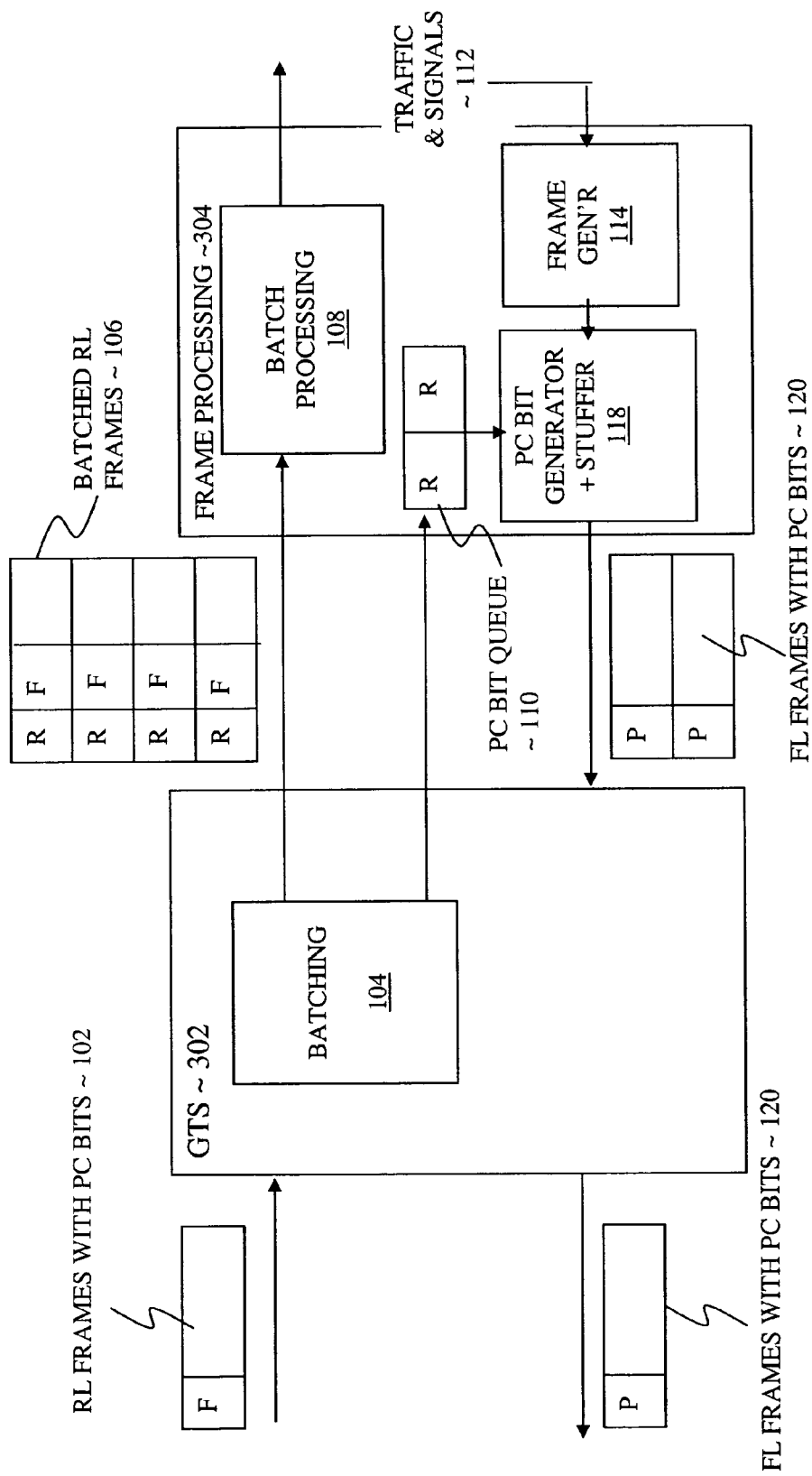
FIG. 3 illustrates an example gateway within which the present invention may be practiced, in one embodiment.

Referring now to FIG. 3, wherein a block diagram illustrating a gateway embodiment of the present invention is shown. The terms gateway, hub, and base station, are sometimes used interchangeably in the art, with gateways being perceived as specialized base stations that direct communications through satellites, while base stations use terrestrial antennas to direct communications within a surrounding geographical region. The expression ground station is sometimes used interchangeably in this field with gateway.

Similar to the generic embodiment illustrated by FIG. 1, gateway 300 includes the earlier described batching logic 104 and power control command generator/stuffer 118, both incorporated within the teachings of the present invention. This embodiment also includes storage element, location, or device 110. Additionally, the embodiment also includes batch processing logic 108 and frame generator 114.

For the gateway embodiment, batching logic 104 is a component of a transceiver subsystem 302, whereas batch processing 108, storage 110, frame generator 114 and power control command generator/stuffer 118 are components of a frame processing subsystem 304.

The elements are operationally coupled to each other as shown. Further, the elements are used and cooperate with one another as earlier described.

In particular, in one embodiment where the power control instructions are in the form of power control bits, storage 110 holds a 2-bit running history in a queue form as earlier described, and generator/stuffer 118 generates slowed response to the power control bits in a manner as earlier described in reference to FIG. 2.

Beside the teachings of the present invention incorporated in transceiver subsystem 302 and frame processing 304, the elements are otherwise known in the art, and accordingly will not be further described herein.

Application of the Gateway Embodiment

Figure 4:
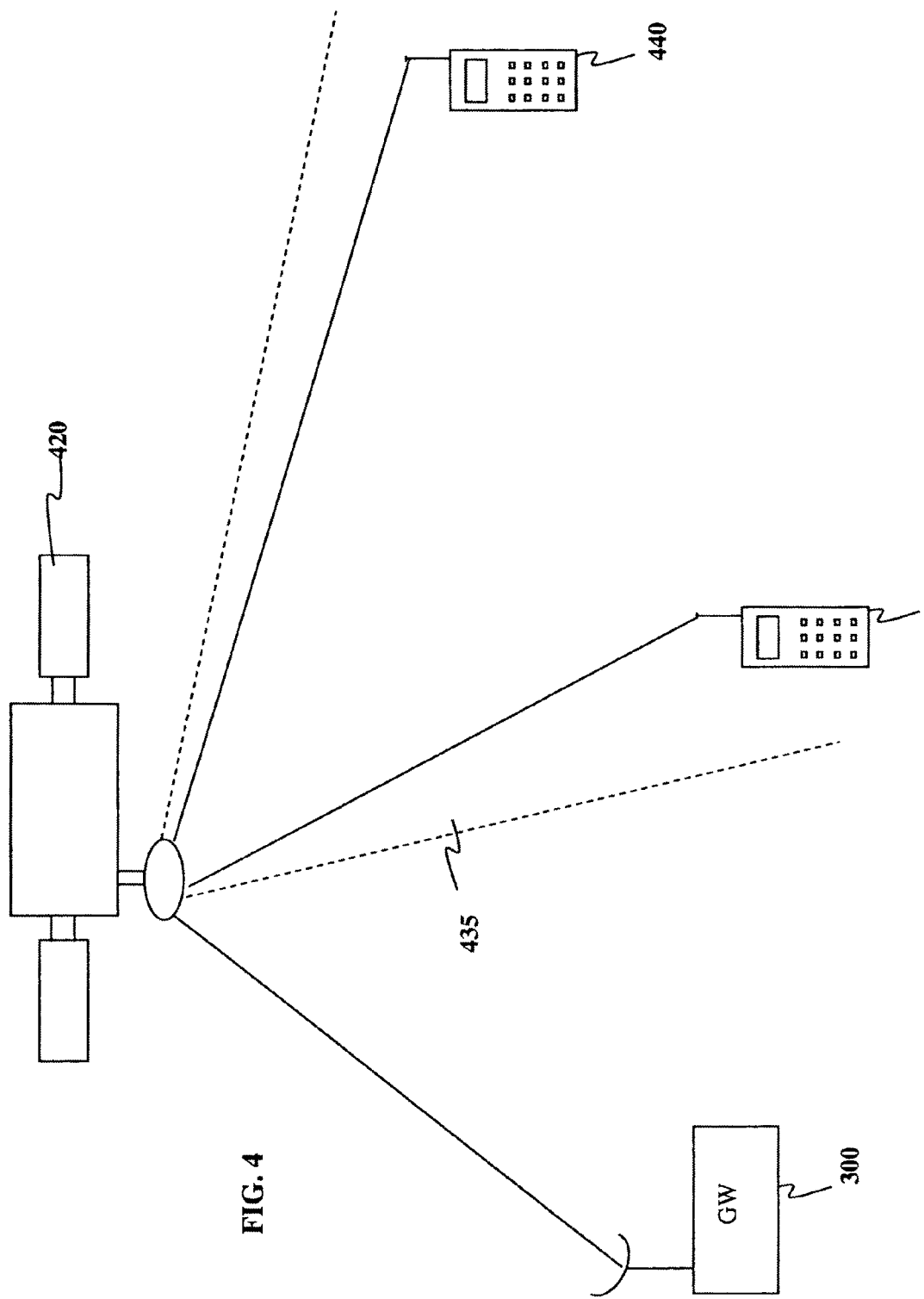
FIG. 4 illustrates a satellite based wireless communication system, within which the example gateway of FIG. 3 may be used, in one embodiment.

FIG. 4 illustrates a MSS within which gateway 300 endowed with the slowed or slower power control response of the present invention, may be employed. As illustrated, the MSS includes user terminals 430 and 440 and gateway 300, bridged by communication satellite 420. First user terminal or terminal device 430 receives transmissions from communications satellite 420 via a forward link of a first channel of a first beam 435, and transmits to communications satellite 420 on the reverse link of the first channel. Second terminal device 440 receives transmissions from communication satellite 420 via a forward link of a second channel of a second beam 445, and transmits to the communication satellite 420 on the reverse link of the second channel.

It is contemplated for this example that satellite 420 provides multiple beams within at least one 'spot' that are directed to cover separate generally non-overlapping geographic regions. Generally, multiple beams at different frequencies, also referred to as CDMA channels (when using CDMA), 'sub-beams' or FDM signals, frequency slots, or channels, can be directed to overlap the same region. However, it is readily understood that the beam coverage or service areas for different satellites, or antenna patterns for terrestrial cell-sites, may overlap completely or partially in a given region depending on the communication system design and the type of service being offered.

To establish the forward or reverse links, the channels may be sub-divided into time slots, as used for TDMA type communications systems or signals, or into code channels, as used by CDMA type communication systems or signals, with each terminal communicating over an assigned code channel. As is well known, these and other combinations can be used to establish the links within channels being discussed herein.

The terms reverse link and forward link were discussed above. The terms reverse link and return link are sometimes used interchangeably in this field, and refer to communication pathways by which signals propagate from a terminal device to a satellite, and from the satellite to a ground station. In terrestrial communication systems, they propagate from a terminal to a base station directly. Forward link refers to communication pathways by which signals propagate from a ground station to a satellite, and from the satellite to a terminal device. In terrestrial communication systems, they propagate from a base station to a terminal directly. In addition, the terms "reverse direction" is used to imply transfer or transmission of signals over a communication link in a direction (RL or FL) in an opposite direction (FL or RL) from those received. This is well understood by those skilled in the art.

User terminals or terminal devices 430 and 440 each have or comprise a wireless communication device such as, but not limited to, a cellular telephone, a data transceiver or a transfer device (e.g., computers, personal data assistants, facsimile). Typically, such units are either hand-held or vehicle mounted as desired. While these user terminals are discussed as being mobile, it is also understood that the teachings of the invention are applicable to fixed units or other types of terminals where remote wireless service is desired. This latter type of service is particularly suited to using satellite repeaters to establish communication links in many remote areas of the world. User terminals, terminals devices, or user terminals, are also sometimes referred to as wireless devices, access terminals, subscriber units, mobile units, mobile stations, or simply "users," "mobiles," or "subscribers" in some communication systems, depending on preference. These terms are well understood in this field.

Gateway 300 transmits forward channel data to terminal devices 430, 440 through communications satellite 420, and receives reverse channel data from terminal devices 430, 440 also through communications satellite 420.

The reverse channel data may include power control instructions, in particular, power control instructions in the form of power control bits. Gateway 300 endowed with the teachings of the present invention, is able to batch process the received reverse channel data, and at the same time, by slowing the response to the power control instructions, reduces the likelihood of issuing excessive consecutive power control commands, and losing the channels.

Except for the teachings of the present invention included in gateway 300, the rest of the elements are known in the art, and accordingly will not be further described.

A Gateway Emulator and Simulator Embodiment

As those skilled in the art would appreciate, development of a MSS requires extensive testing. Field or live testing is often expensive. Thus, a substantial amount of the testing is conducted in the development laboratory, under an emulated and/or simulated environment.

Figure 5:
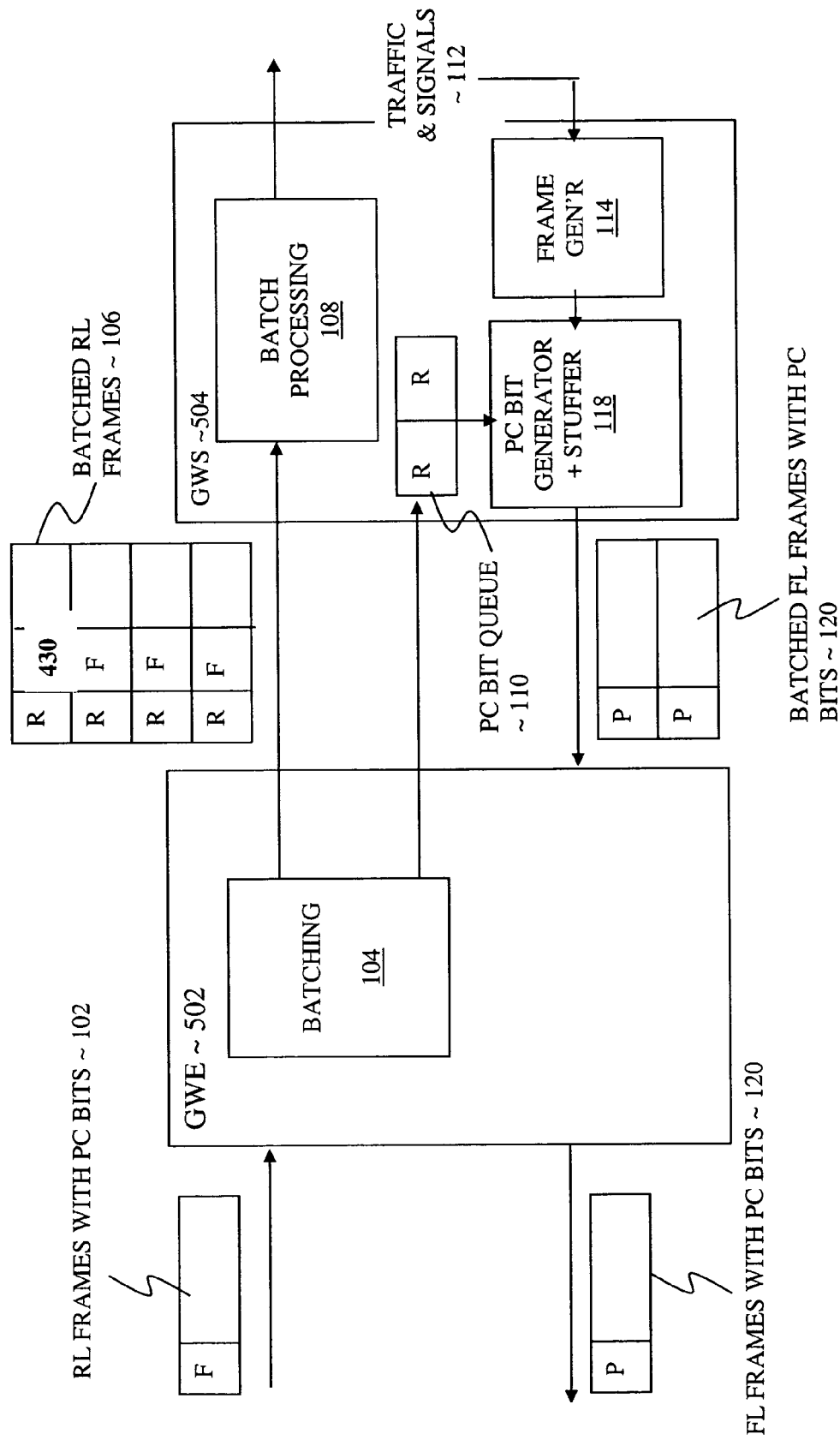
FIG. 5 illustrates an example gateway emulator and an example gateway simulator within which the present invention may be practiced, in one embodiment.

FIG. 5 illustrates a gateway emulator and simulator embodiment of the present invention. Also similar to the generic embodiment illustrated by FIG. 1, the emulator and simulator pair 502 and 504 includes the earlier described batching logic 104 and power control response generator/stuffer 118, both incorporated within the teachings of the present invention. The embodiment also includes storage 110. Additionally, the embodiment also includes batch processing logic 108 and frame generator 114.

For the embodiment, batching logic 104 is a component of emulator 502, whereas batch processing 108, storage 110, frame generator 114 and power control response generator/stuffer 118 are components of simulator 304.

The elements are operationally coupled to each other as shown. Further, the elements are used and cooperate with one another as earlier described.

In particular, in one embodiment where the power control instructions are in the form of power control bits, storage 110 holds a 2-bit running history in a queue form as earlier described, and generator/stuffer 118 generates slowed response to the power control bits as earlier described referencing FIG. 2.

Besides the teachings of the present invention incorporated in gateway emulator 502 and simulator 504, the elements may include other components, such as networking and other interfaces for interfacing with each other and with other elements, such as user terminals and so forth. The exact composition of emulator 502 and simulator 504 is not essential to the practice of the present invention, and accordingly will not be further described.

Application of the Gateway Emulator and Simulator Embodiment

Figure 6:
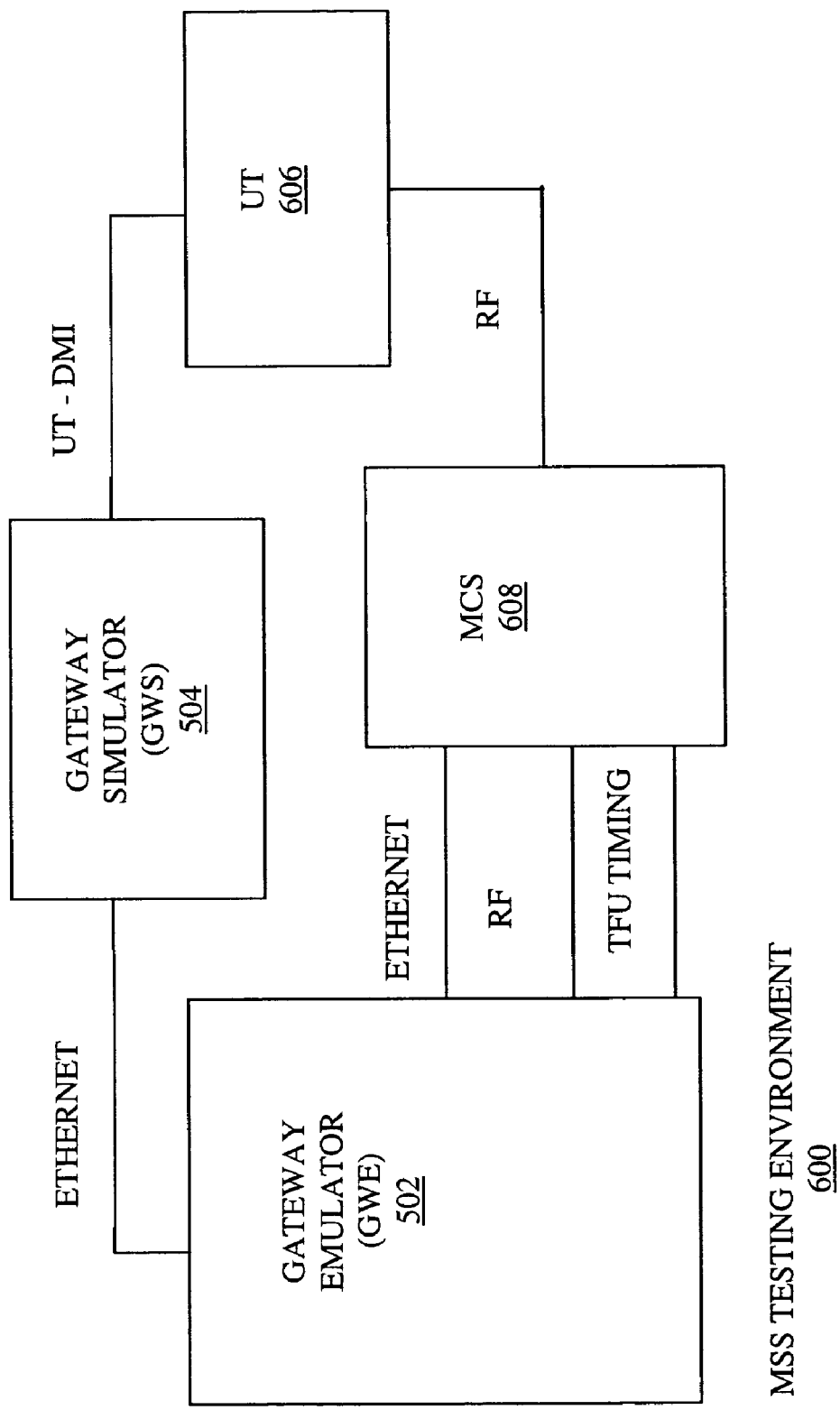
FIG. 6 illustrates a wireless communication test system, within which the example gateway emulator and simulator of FIG. 5 may be used, in one embodiment.

FIG. 6 illustrates a MSS testing environment within which emulator and simulator 502-504 endowed with the slowed power control response of the present invention may be employed. For the embodiment, in addition to the emulator and simulator pair 502-504, MSS testing environment 600 includes user terminal 606 and a mobile communication subsystem (MCS) 608.

Emulator 502 includes in particular, a number of networking interfaces, such as Ethernet interfaces, a radio frequency (RF) interface, and a timing and frequency unit (TFU) (all not shown), and simulator 504 includes a networking interface, and a diagnostic monitor (also not shown).

Emulator 502 and simulator 504 are coupled to each other via the networking connection, and exchange commands and data with each other over the networking connection, to allow simulator 504 to drive emulator 502 for the purpose of testing the MSS.

User terminal 606 communicates with MCS 608 over one or more radio frequencies (RF), and communicates with gateway simulator 504 over a UT-DMI (diagnostic monitor interface), to allow gateway simulator 504 to drive it for the purpose of testing.

MCS 608 in turn communicates with emulator 502 over the networking interface, for control commands, over RF, for user data, and over the TFU connection for timing and frequency information.

Again, except for the teachings of the present invention endowed in gateway emulator and simulator 502-504, the exact constitution and operation of the remaining elements are non-essential to the practice of the present invention to slow the speed or response rate to power control instructions, in particular, in the context of batch processing transmission frames.

Implementation

Various aspects of the present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, micro-controller, or general-purpose computer.

Figure 7:
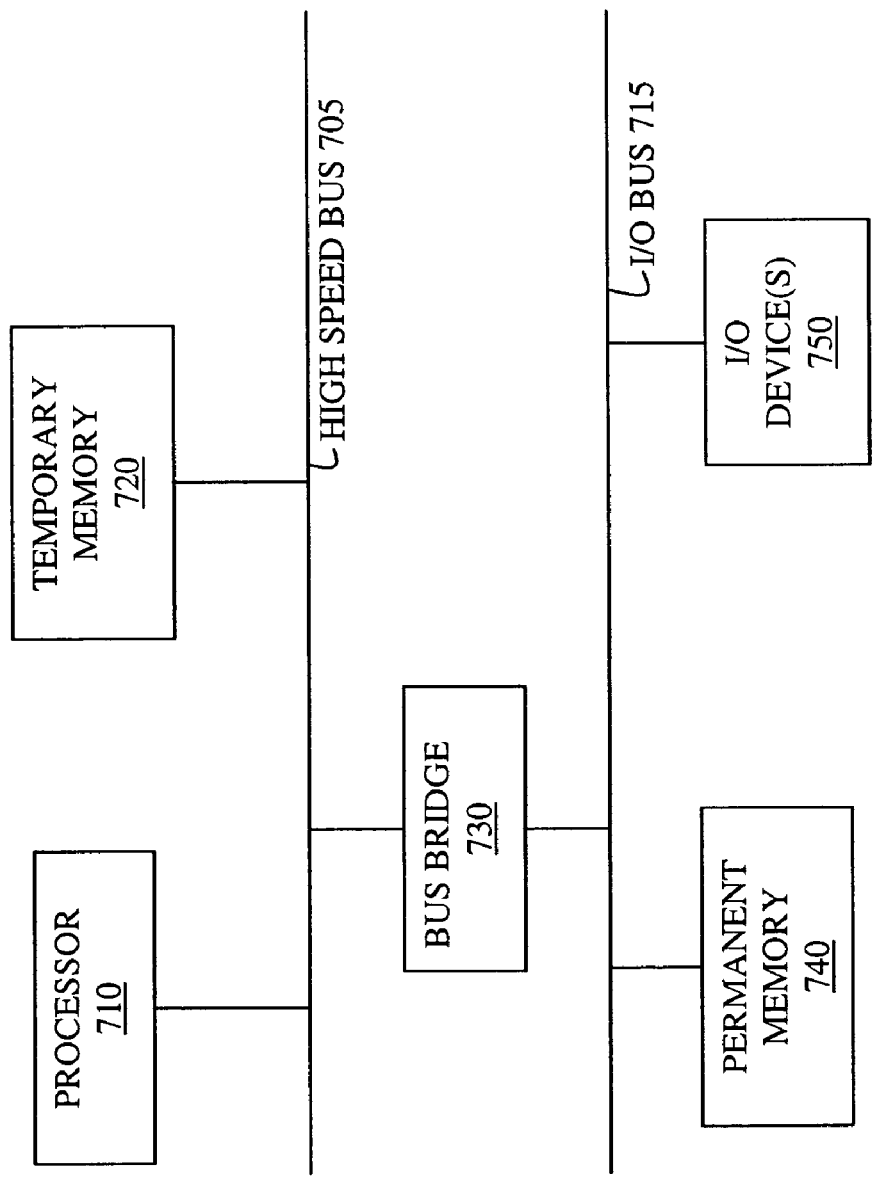
FIG. 7 illustrates one embodiment of a hardware system to implement various embodiments.

Various embodiments of the present invention use computational resources to carry out the above-described functionality. FIG. 7 illustrates one embodiment of a hardware system intended to represent a broad category of computer systems such as personal computers, workstations, and/or embedded systems. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device(s) 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternatively, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternative internal networks including, for instance, an internal network based on a high speed system bus with a memory controller hub and an I/O controller hub. Additional components may include additional processors, a CD ROM drive, additional memories, and other peripheral components known in the art.

In one embodiment, as described above, is implemented using one or more hardware systems such as the hardware system of FIG. 7. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 740.

Figure 8:
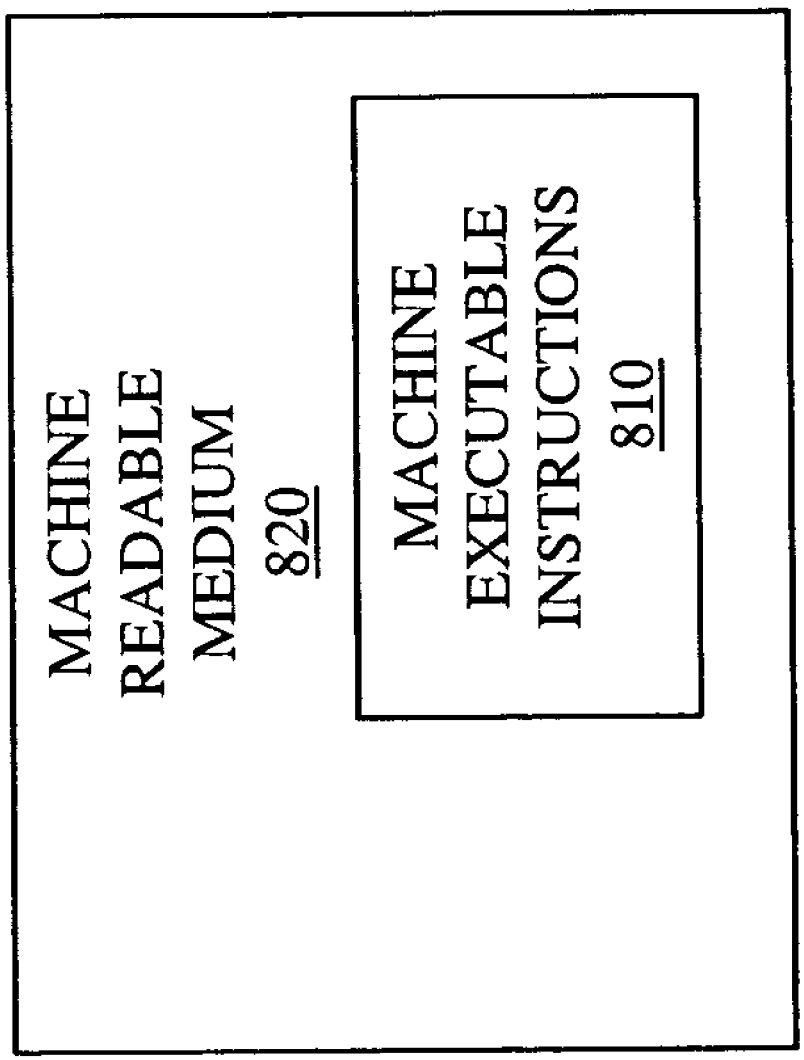
FIG. 8 illustrates one embodiment of a machine-readable medium to store executable instructions to implement various embodiments.

Alternatively, as shown in FIG. 8, the software routines can be machine executable instructions 810 stored using any machine readable storage medium 820, such as a diskette, CD-ROM, magnetic tape, digital video or versatile disk (DVD), laser disk, ROM, flash memory, etc. The series of instructions need not be stored locally, and could be received from a remote storage device, such as a server on a network, a CD ROM device, a floppy disk, etc., through, for instance, I/O device(s) 750 of FIG. 7.

From whatever source, the instructions may be copied from the storage device into temporary memory 720, and then accessed and executed by processor 710. In one implementation, these software routines are written in the C programming language. It is to be appreciated, however, that these routines may be implemented in any of a wide variety of programming languages.

In alternative embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards, and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

CONCLUSION

Accordingly, a history based method and apparatus which decreases the speed at which responses to power control instructions are implemented in MSS applications have been described.

An advantage of the present invention is to reduce the likelihood of over issuing consecutive power control commands, which might lead to the loss of a channel or communication link, in particular, when transmission frames are grouped together, queued, or batched for processing.

Although the invention is described primarily in terms of wireless, satellite-based communications, the present invention may be applicable to other types of communications channel(s), including digital, electrical or optical, wireless or wire/fiber, etc. where signal delay is an element of the communication links that one desires to compensate for.

What is claimed is:

1. A method comprising:
   receiving power control instructions via a first link in a first plurality of frames, the power control instructions being sent from a first station to a second station and used to adjust transmit power of the second station;
   keeping a running history, up to a predetermined length, of the received power control instructions; and
   generating power control bits for transmission via a second link in a second plurality of frames, the power control bits being sent from the second station at an effectual response rate based at least in part on the running history being kept for the power control instructions received via the first link, the effectual response rate being a function of the predetermined length and directly proportional to a batch processing rate of a batching process, wherein m "zero" value power control bits and n "one" value power control bits are generated for each batch formed with a subset of the second plurality of frames, with m and n being integers determined based on number of power control instructions with "0" value and number of power control instructions with "1" value in the running history.

2. The method of claim 1, wherein said generating comprises alternating between generating "one" value power control bit and "zero" value power control bit for each batch formed with a subset of the second plurality of frames.

3. The method of claim 1, wherein if the running history includes two power control instructions of "11" for two frames received via the first link, each batch includes one extra "one" value power control bit if there are odd number of frames in each batch, and each batch includes two extra "one" value power control bits if there are even number of frames in each batch.

4. The method of claim 1, wherein each batch includes equal number of "zero" value power control bits and "one" value power control bits if the running history includes two power control instructions of "01" or "10" for two frames received via the first link and if there are even number of frames in each batch.

5. The method of claim 1, wherein if the running history includes two power control instructions of "00" for two frames received via the first link, each batch includes one extra "zero" value power control bit if there are odd number of frames in each batch, and each batch includes two extra "zero" value power control bits if there are even number of frames in each batch.

6. The method of claim 1, wherein said keeping and generating operations are being performed in a gateway of a wireless communication system.

7. The method of claim 1, wherein said keeping and generating operations are being performed in an emulated gateway and a gateway simulator of a wireless communication test system.

8. The method of claim 1, wherein m and n differ by 1 if each batch of the subset of the second plurality of frames contains an odd number of frames and if the number of power control instructions with "0" value is equal to the number of power control instructions with "1" value in the running history.

9. The method of claim 8, wherein m is greater than n by 1 for batches of odd ordinal positions in their order of formation, and n is greater than m by 1 for batches of even ordinal positions in their order of formation.

10. The method of claim 8, wherein m is greater than n by 1 for batches of even ordinal positions in their order of formation, and n is greater than m by 1 for batches of odd ordinal positions in their order of formation.

11. A gateway of a wireless communication system, comprising:
    a transceiver to receive power control instructions in a first plurality of frames on a first link, the power control instructions being sent from a terminal to the gateway and used to adjust transmit power of the gateway; and
    a processing subsystem coupled to the transceiver
    to receive the power control instructions outputted by the transceiver,
    to keep a running history, up to a predetermined length, of the received power control instructions,
    to generate power control bits for transmission via a second link in a second plurality of frames, to batch the second plurality of frames according to a batching process having a batch processing rate, to generate the power control bits based at least in part on the running history being kept for the received power control instructions, to generate m "zero" value power control bits and n "one"

value power control bits for each batch formed with a subset of the second plurality of frames, with m and n being integers determined based on number of power control instructions with "0" value and number of power control instructions with "1" value in the running history, and to send the power control bits at an effectual response rate, the effectual response rate being a function of the predetermined length and directly proportional to the batch processing rate.

12. The gateway of claim 11, wherein the processing subsystem alternates between generating "one" value power control bit and "zero" value power control bit for each batch formed with a subset of the second plurality of frames.

13. The gateway of claim 11, wherein if the running history includes two power control instructions of "11" for two frames received via the first link, the processing subsystem generates one extra "one" value power control bit in each batch if there are odd number of frames in each batch and generates two extra "one" value power control bits in each batch if there are even number of frames in each batch.

14. The gateway of claim 11, wherein the processing subsystem generates equal number of "zero" value power control bits and "one" value power control bits for each batch if the running history includes two power control instructions of "01" or "10" for two frames received via the first link and if there are even number of frames in each batch.

15. The gateway of claim 11, wherein if the running history includes two power control instructions of "00" for two frames received via the first link, the processing subsystem generates one extra "zero" value power control bit in each batch if there are odd number of frames in each batch and generates two extra "zero" value power control bits in each batch if there are even number of frames in each batch.

16. The gateway of claim 11, wherein the processing subsystem generates either one more "zero" value power control bit or one more "one" value power control bit for each batch of the subset of the second plurality of frames if each batch contains an odd number of frames and if the number of power control instructions with "0" value is equal to the number of power control instructions with "1" value in the running history.

17. The gateway of claim 16, wherein the processing subsystem is designed to generate one more "zero" value power control bit for batches of odd ordinal positions in their order of formation, and one more "one" value power control bit for batches of even ordinal positions in their order of formation.

18. The gateway of claim 16, wherein the processing subsystem is designed to generate one more "zero" value power control bit for batches of even ordinal positions in their order of formation, and one more "one" value power control bit for batches of odd ordinal positions in their order of formation.

19. A wireless communication testing system, comprising:
a processor;
a gateway emulator to emulate a gateway including receipt of power control instructions in a first plurality frames on a first link, the power control instructions being used to adjust transmit power of the gateway; and
a gateway simulator coupled to the gateway emulator
to receive the power control instructions from the gateway emulator,
to maintain a running history, over a predetermined length, of the received power control instructions,
to generate power control bits for transmission via a second link in a second plurality of frames, to batch the second plurality of frames according to a batching process having a batch processing rate, to generate the power control bits based at least in part on the running history being kept for the received power control instructions, to generate m "zero" value power control bits and n "one" value power control bits for each batch formed with a subset of the second plurality of frames, with m and n being integers determined based on number of power control instructions with "0" value and number of power control instructions with "1" value in the running history, and to send the power control bits at an effectual response rate, the effectual response rate being a function of the predetermined length and directly proportional to the batch processing rate.

20. The wireless communication testing system of claim 19, wherein the gateway simulator alternates between generating "one" value power control bit and "zero" value power control bit for each batch formed with a subset of the second plurality of frames.

21. The wireless communication testing system of claim 19, wherein if the running history includes two power control instructions of "11" for two frames received via the first link, the gateway simulator generates one extra "11" value power control bit in each batch if there are odd number of frames in each batch and generates two extra "one" value power control bits in each batch if there are even number of frames in each batch.

22. The wireless communication testing system of claim 19, wherein the gateway simulator generates equal number of "zero" value power control bits and "one" value power control bits for each batch if the running history includes two power control instructions of "01" or "10" for two frames received via the first link and if there are even number of frames in each batch.

23. The wireless communication testing system of claim 19, wherein if the running history includes two power control instructions of "00" for two frames received via the first link, the gateway simulator generates one extra "zero" value power control bit in each batch if there are odd number of frames in each batch and generates two extra "zero" value power control bits in each batch if there are even number of frames in each batch.

24. The wireless communication testing system of claim 19, wherein the gateway simulator generates either one more "zero" value power control bit or one more "one" value power control bit for each batch of the subset of the second plurality of frames if each batch contains an odd number of frames and if the number of power control instructions with "0" value is equal to the number of power control instructions with "1" value in the running history.

25. The wireless communication testing system of claim 24, wherein the gateway simulator is designed to generate one more "zero" value power control bit for batches of odd ordinal positions in their order of formation, and one more "one" value power control bit for batches of even ordinal positions in their order of formation.

26. The wireless communication testing system of claim 24, wherein the gateway simulator is designed to generate one more "zero" value power control bit for batches of even ordinal positions in their order of formation, and one more "one" value power control bit for batches of odd ordinal positions in their order of formation.

27. A computing apparatus comprising:
means for receiving, with the computing apparatus, power control instructions via a first link in a first plurality of frames, the power control instructions being sent from a first station to the computing apparatus and used to adjust transmit power of the computing apparatus;

means for keeping a running history, up to a predetermined length, of the received power control instructions; and means for generating, with the computing apparatus, power control bits for transmission via a second link in a second plurality of frames, the power control bits being sent at an effectual response rate based at least in part on the running history being kept for the power control instructions received via the first link, the effectual response rate being a function of the predetermined length and directly proportional to a batch processing rate of a batching process, wherein m "zero" value power control bits and n "one" value power control bits are generated for each batch formed with a subset of the second plurality of frames, with m and n being integers determined based on number of power control instructions with "0" value and number of power control instructions with "1" value in the running history.

28. A non-transitory storage device storing thereon machine executable instructions that when executed implement a method comprising:

receiving power control instructions via a first link in a first plurality of frames, the power control instructions being sent from a first station to a second station and used to adjust transmit power of the second station;

keeping a running history, up to a predetermined length, of the received power control instructions; and generating power control bits for transmission via a second link in a second plurality of frames, the power control bits being sent at an effectual response rate based at least in part on the running history being kept for the power control instructions received via the first link, the effectual response rate being a function of the predetermined length and directly proportional to a batch processing rate of a batching process, wherein m "zero" value power control bits and n "one" value power control bits are generated for each batch formed with a subset of the second plurality of frames, with m and n being integers determined based on number of power control instructions with "0" value and number of power control instructions with "1" value in the running history.

29. A non-transitory storage device storing thereon machine executable instructions that when executed implement a method comprising:

emulating a gateway including receipt of power control instructions in a first plurality frames on a first link, the power control instructions being used to adjust transmit power of the gateway;

emulating a gateway simulator to receive the power control instructions, to keep a running history, up to a predetermined length, of the received power control instructions, to generate power control bits for transmission via a second link in a second plurality of frames, to batch the second plurality of frames according to a batching process having a batch processing rate, to generate the power control bits based at least in part on the running history being kept for the power control instructions received via the first link, to generate m "zero" value power control bits and n "one" value power control bits for each batch formed with a subset of the second plurality of frames, with m and n being integers determined based on number of power control instructions with "0" value and number of power control instructions with "1" value in the running history, and to send the power control bits at an effectual response rate, the effectual response rate being a function of the predetermined length and directly proportional to the batch processing rate.

* * * * *